No. 874,343. PATENTED DEC. 17, 1907.
A. JENSEN.
LIQUID RIPENER, PASTEURIZER, AND COOLER.
APPLICATION FILED SEPT. 16, 1907.
2 SHEETS—SHEET 1.
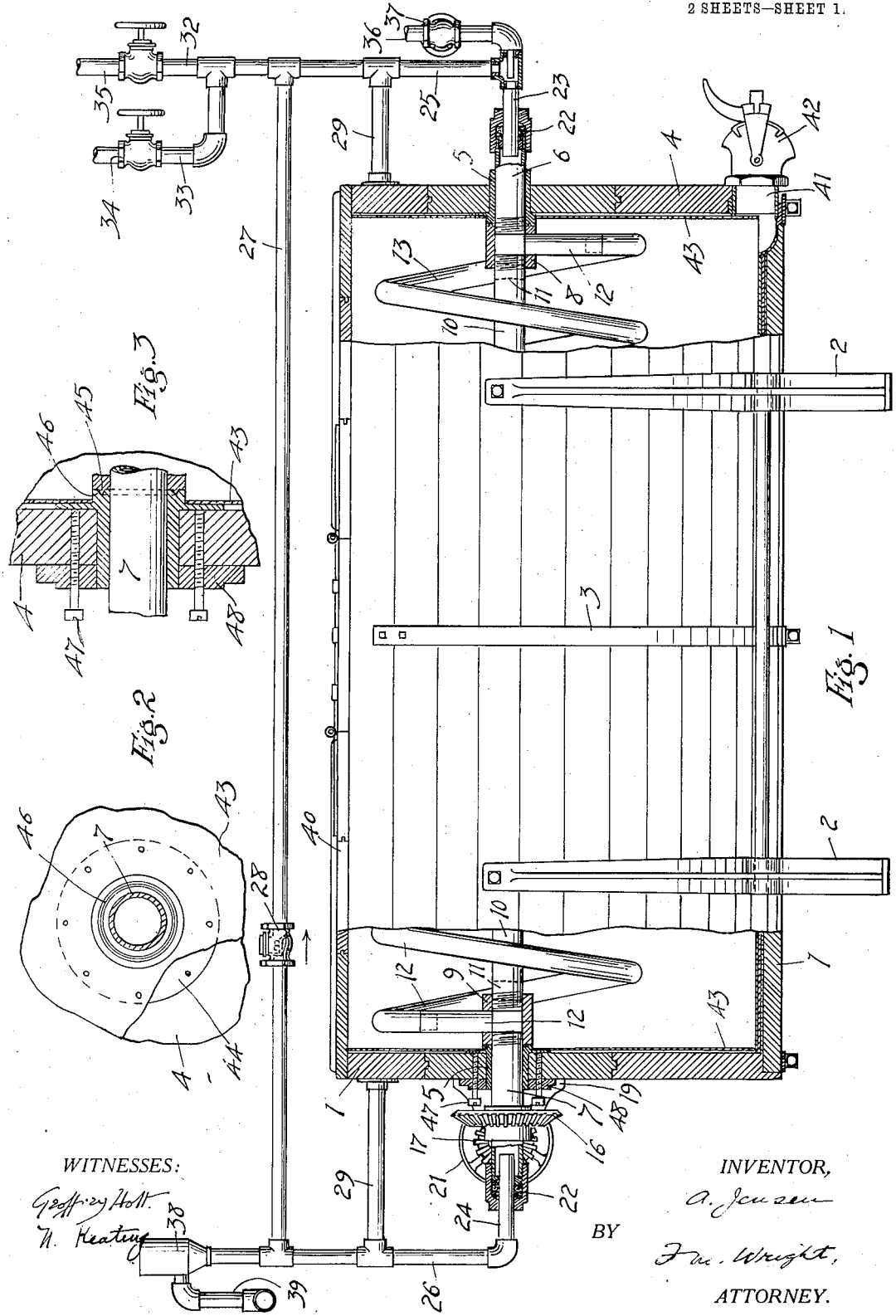
WITNESSES:
Geoffrey Holt
N. Keating
INVENTOR,
A. Jensen
BY
F. M. Wright,
ATTORNEY.

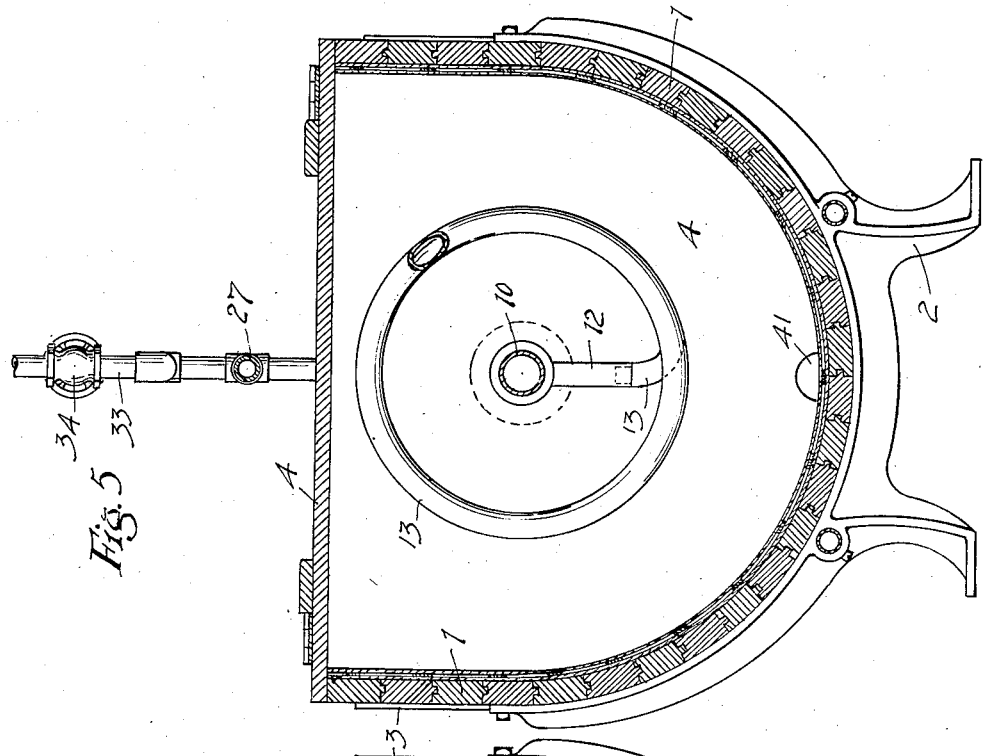
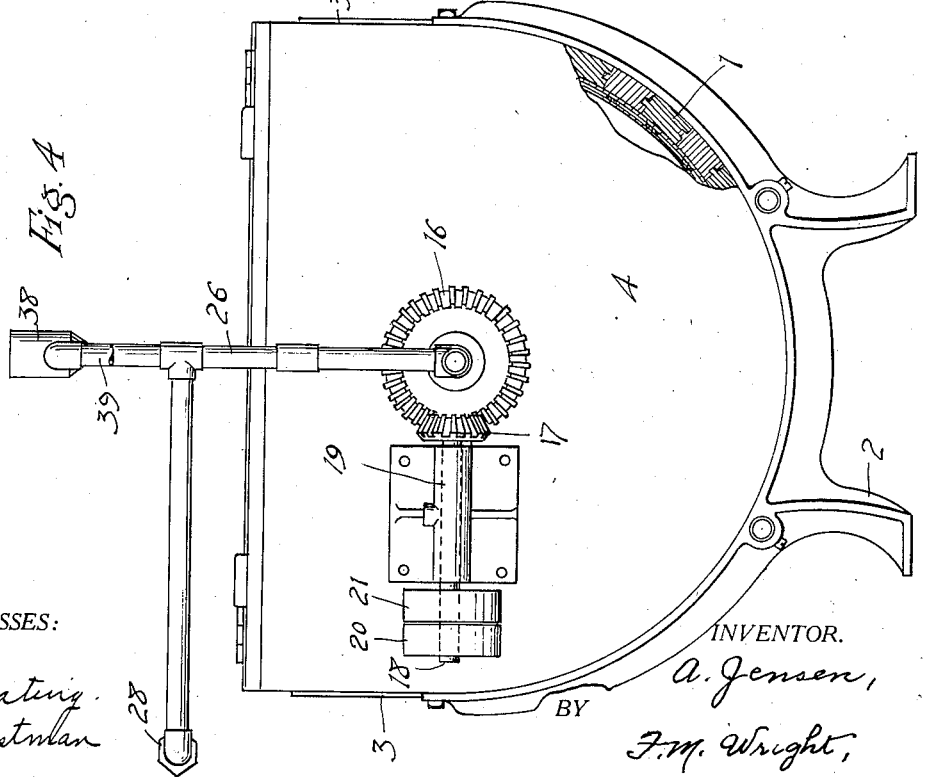

UNITED STATES PATENT OFFICE.

AAGE JENSEN, OF EUREKA, CALIFORNIA.

LIQUID RIPENER, PASTEURIZER, AND COOLER.

No. 874,343.

Specification of Letters Patent.

Patented Dec. 17, 1907.

Application filed September 16, 1907. Serial No. 393,045.

*To all whom it may concern:*

Be it known that I, AAGE JENSEN, a citizen of the United States, residing at Eureka, in the county of Humboldt and State of California, have invented new and useful Improvements in Liquid Ripeners, Pasteurizers, and Coolers, of which the following is a specification.

The object of the present invention is to provide an apparatus for ripening cream, or for pasteurizing milk, cream or other liquids, or for heating or cooling liquids in general, which is cheap and simple in construction, and convenient in operation, and which can be used interchangeably for any of the above purposes.

A further object of the invention is to provide an apparatus of this character by means of which a liquid can be first pasteurized, and then cooled, without the necessity of exposure to the atmosphere, or of any action which would tend to contaminate the liquid.

In the accompanying drawing, Figure 1 is a broken side view, partly in section, of my improved apparatus; Fig. 2 is an enlarged broken end view of the same, and Fig. 3 a similar longitudinal section of a bearing; Fig. 4 is a broken transverse section; Fig. 5 is a cross section of the same.

Referring to the drawing, 1 indicates the casing of a receptacle, mounted upon legs 2, the staves of said casing being held in place by one or more straps 3. Each end 4 of the casing is apertured and in said apertures are bearings 5, for hollow shafts 6, 7. Said shafts are connected at their inner ends with sleeves 8, 9, which are connected by a tube 10, extending longitudinally through the machine, the purpose of this tube being merely to brace and strengthen the moving parts of the machine. It is therefore closed against the passage of fluid by means of blocks 11. Into the sides of said sleeves are screwed pipe sections 12, which extend radially from said sleeves, and with the other ends of said pipe sections are connected the ends of a helical coil 13.

A rotary motion is imparted to said shafts and to said coil by means of a bevel gear 16 mounted upon a shaft 7 and meshing with a bevel pinion 17 upon a transverse horizontal shaft 18 mounted in a box 19 secured upon an end of the casing and carrying tight and loose pulleys 20 and 21, by means of which the apparatus can be rotated from any distant source of power.

With the hollow shafts 6, 7, at opposite ends of the machine are connected through stuffing boxes 22 pipes 23, 24, which are connected by vertical pipes 25, 26 with a return pipe 27, having therein a check valve 28, thereby providing a complete fluid circuit. These vertical pipes are suitably supported by means of braces 29 extending from the ends of the casing. With the pipe 25 at one end are connected pipes 32, 33, controlled by valves 34, 35, and which may be connected with sources of supply of cold water, or brine, or other cooling fluid, or a heating fluid. However, for the purpose of heating, it is generally preferred to use a steam injector, shown at 36, controlled by a valve 37, which not only supplies heat to the helical coil but also causes the liquid to circulate therein. The other vertical pipe 26 is extended at the top and carries an overflow vessel 38, with an overflow pipe 39. This is used to provide any desired pressure in the coil.

The receptacle is provided with hinged lids or covers 40. In order to discharge the liquid from the interior of the receptacle it is formed with a discharge passage 41 controlled by a gatevalve 42.

The interior of the receptacle is provided with a lining 43 of a metal which is not injurious to the liquids contained therein and each bearing 5 is formed with a flange 44 secured by rivets or otherwise to said lining so as to make a fluid tight connection therebetween. The inner end of each bearing abuts against the adjacent end of the adjacent sleeve, said surfaces, of each bearing and the corresponding sleeve, being provided, the one with an annular tongue 45 and the other with an annular groove 46, thus forming an annular joint for preventing the passage of fluid therebetween. In order to insure a tight fit of said joint, there are provided adjusting screws 47 which are screwed through a plate 48, secured upon one of the heads of the receptacle. By screwing up said screws, said surfaces can be brought close together and at the same time the pressure is transmitted to the other end of the tube 10 causing the other sleeve to fit tightly against the adjacent bearing in said end.

It will be seen that the above construction provides an apparatus which is simple and cheap, and yet effective, and which can be used to great advantage in small dairies, as it can be employed interchangeably either as a cream ripener, as a pasteurizer for milk and cream, or as a cooler by suitably connecting the supply pipes with hot or cold liquids of the proper temperature.

The form of the coil is very effective for transmitting heat or cold to the liquid contained in the receptacle for two reasons, first, that, in the rotation of the coil, each part of the liquid within the radius of the coil is brought into actual contact with some part thereof; and, secondly, a coil of this helical form, when rotated, produces a longitudinal, circulatory movement of the liquid, said liquid being thereby forced to one end of the receptacle, then outwards and then returning in the outer portion thereof. Hence all parts of the liquid are quickly brought into close contact with the coil, and heat or cold are quickly and efficiently abstracted therefrom. Moreover, on account of the tube being perfectly smooth and round and free from sharp angles, it is readily maintained perfectly clean, a condition which is absolutely essential in dairy operations. But the most important feature of the present invention is, that the construction enables a liquid such as milk or cream to be first pasteurized by maintaining it for a sufficient length of time at a suitable high temperature, and while still contained in the same receptacle and without any exposure to the outside atmosphere, the liquid can be cooled to the proper temperature, by shutting off the supply of steam and other heated fluid, and passing through the same coil a suitable cooling fluid.

I claim:—

1. In an apparatus of the character described, the combination of a suitable receptacle for containing the liquid to be treated, a pipe therein in the form of a helical coil, connections with the ends of said pipe extending to the outside of the receptacle, means for rotating said coil, and means for conducting a heating or cooling medium into one end of said coil and out from the other end thereof, substantially as described.

2. In an apparatus of the character described, the combination of a suitable receptacle for containing the liquid to be treated, a pipe therein in the form of a helical coil, connections with the ends of said pipe extending to the outside of the receptacle, means for rotating said coil, means for conducting a heating or cooling medium to one end of said coil and out from the other end thereof, and a conduit connecting the outer ends of said connections to provide a return circuit, substantially as described.

3. In an apparatus of the character described, the combination of a suitable receptacle for containing the liquid to be treated, a pipe therein in the form of a helical coil, connections with the ends of said pipe extending to the outside of the receptacle, means for rotating said coil, a pipe for supplying a liquid to said coil, an injector for injecting steam into said coil, and means for independently controlling said pipe and injector, substantially as described.

4. In an apparatus of the character described, the combination of a suitable receptacle for containing the liquid to be treated, a pipe therein in the form of a helical coil, connections with the ends of said pipe extending to the outside of the receptacle, bearings for said connections, a metallic lining for said receptacle, said bearings being connected fluid-tight to said lining, means for rotating said coil, and means for conducting a heating or cooling medium into one end of said coil and out from the other end thereof, substantially as described.

5. In an apparatus of the character described, the combination of a suitable receptacle for containing the liquid to be treated, bearings in the ends of said receptacle, hollow shafts therein, sleeves connected to said shafts, a helical coil of pipe connected at its ends with the respective sleeves, means for rotating said shafts, and means for supplying a heating or cooling medium to one of said shafts, and withdrawing it from the other, substantially as described.

6. In an apparatus of the character described, the combination of a suitable receptacle for containing the liquid to be treated, bearing in the ends of said receptacle, hollow shafts therein, sleeves connected to said shafts, a helical coil of pipe connected at its ends with the respective sleeves, a central rigid brace directly connecting said sleeves, means for rotating said shafts, and means for supplying a heating or cooling medium to one of said shafts, and withdrawing it from the other, substantially as described.

In testimony whereof I have hereunto set my hand in the presence of two subscribing witnesses.

AAGE JENSEN.

Witnesses:
  FRANCIS M. WRIGHT,
  D. B. RICHARDS.